July 12, 1966 EISUKE FUJIMOTO 3,260,470

MAGNETIC TAPE DRIVE MECHANISM

Filed Nov. 27, 1963 2 Sheets-Sheet 1

INVENTOR
EISUKE FUJIMOTO
BY Eyre, Mann & Lucas

INVENTOR

BY EISUKE FUJIMOTO

Eyre Mann, & Lucas

United States Patent Office 3,260,470

Patented July 12, 1966

3,260,470

MAGNETIC TAPE DRIVE MECHANISM

Eisuke Fujimoto, Ohta-ku, Tokyo, Japan, assignor to Akai Electric Co., Ltd., Tokyo, Japan, a corporation of Japan Filed Nov. 27, 1963, Ser. No. 326,609
Claims priority, application Japan, Nov. 29, 1962, 37/53,386
5 Claims. (Cl. 242—55.12)

Figures 1, 1A, 3, 4:
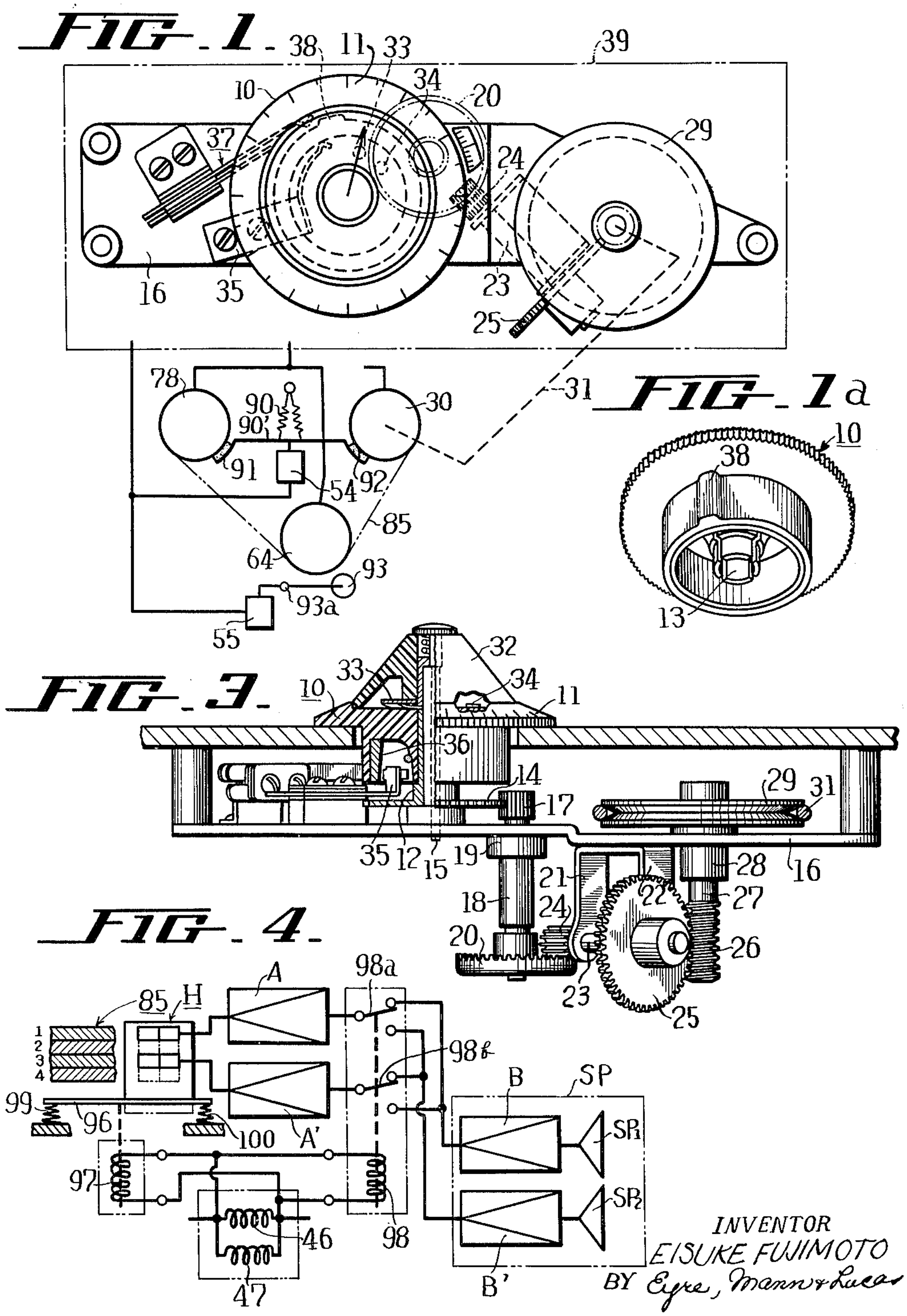

This invention relates to magnetic tape recording and reproducing machines and particularly to automatic reciprocating tape drive mechanisms built in such machines with which an operator can enjoy, if wanted, a practically infinite number of repeated plays of a musical program, for instance, a program recorded on a selected length of the whole roll of the standard magnetic tape which is often employed. With use of the same tape drive, several recordings can be realized along a predetermined length or, if necessary, substantially the whole length of the magnetic tape, hereinafter being called only "tape" for simplicity, yet under the utilization of a plurality of parallel record tracks extending longitudinally on the tape by shifting from track to track at each reversal of the tape drive. This technique assures, as well known to those skilled in the art, a long extended continuous recording which extends several times a selected length or, when necessary, the whole length of a tape. The recording, or the reproducing, can be effected in the monaural or stereto technique as required.

In the conventional techniques, each reversal of the tape drive is carried into effect with the playing conditions kept unchanged. More specifically, when the machine is of the capstan drive type, the reversal operation is carried out with a pressure roller kept in contact with the capstan. It will be noted that with use of such conventional tape drive mechanism, the electric motors, hereinafter being called only "motors" for simplicity, used for the capstan and tape reel drive are heavily loaded by virtue of the tape pinched between the capstan and the pressure roller.

At the reversal of the tape drive and thus of the drive motors, it is that each of the drive motors generate larger torque than that required for the regular tape drive. In addition to this operating condition, the aforementioned additional load is imposed upon the drive motors and may give rise to fluctuations in the tape feed, which will highly degrade the tone quality. Furthermore, the thus increased load at each reversal of the tape drive may lead to a stoppage of any one of the said motors, an excessive elongation of belts conventionally employed in the tape drive mechanism or an overheating in the motors. Further, the tape itself may be subjected to higher tensile stresses than a predetermined allowable value.

It is therefore the main object of the invention to provide a novel and improved tape drive mechanism which obviates substantially the above drawbacks inherent in the conventional machine of the kind above referred to, thus relieving overloads imposed on the tape drive motors, especially that destined for the capstan drive, which are attributable to the tape being held firm in its operating position at each of the necessary reversal operations for reciprocating plays of the machine.

An object of the present invention is to provide an improved tape drive mechanism of the kind above referred to which may considerably reduce wows and other like disadvantageous tone defects at each reversing operation of the tape drive.

Figure 2:
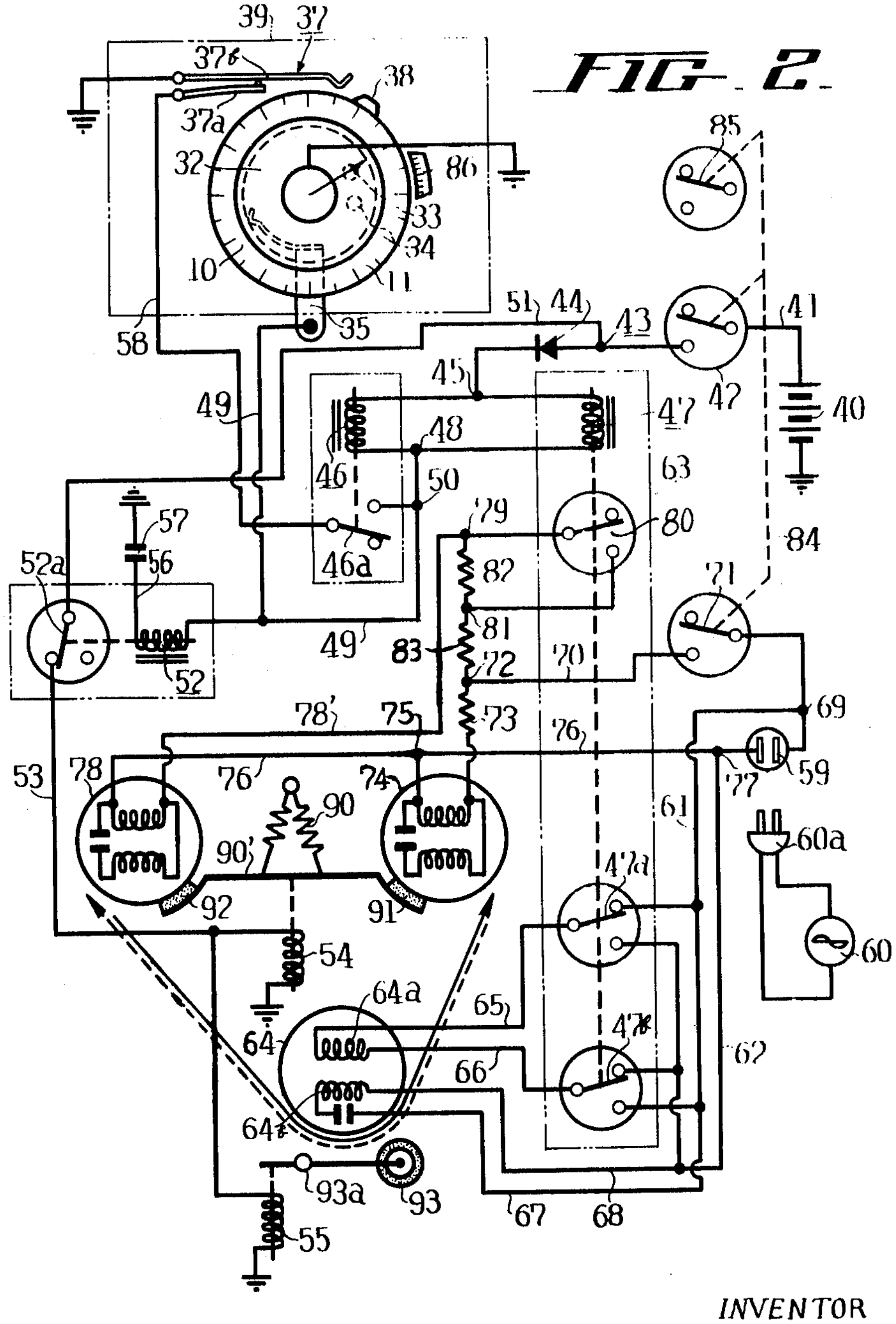

These features as well as further objects of the invention will appear from the following detailed description taken in connection with the accompanying drawings in which:

FIG. 1 is a schematic representation of the novel mechanism as represented by way of example by a preferred embodiment applied to a conventional magnetic tape recording and playback machine, yet with several electrical components omitted therefrom for clear representation of the drawing;

FIG. 1*a* is a perspective detail view of a control knob employed in the mechanism shown in FIG. 1;

FIG. 2 is a circuit diagram including electrical constituents of the novel mechanism, wherein intentionally omitted constituents from FIG. 1 are also shown;

FIG. 3 is a partially sectioned side view of a duplex rotary switch assembly which is adapted to be driven from the tape reeling mechanism of the machine and in turn to automatically control the tape drive reversing operation; and FIG. 4 is a schematic representation of an embodiment of the magnetic head arrangement employable in connection with the novel tape drive mechanism of the present invention.

Referring now to FIGURES 1*a* and 3, a dial 10 carrying a proper scale 11 thereon is frictionally mounted on a vertically arranged sleeve 12 through the intermediary of a friction coupling 13. The sleeve is provided at its lowermost end with a gear 14 and is rotatably mounted on a stationary shaft 15 studded to a supporting plate 16 which is mounted in turn fixedly on an upper panel 100 of the conventional chassis of the machine, although the said chassis is not shown. Gear 14 is kept in engagement with a pinion 17 which is fixedly supported on the top end of an intermediate shaft 18. The latter shaft is rotatably supported in a bearing 19 which is again fixedly mounted on plate 16. This intermediate shaft extends downwardly from plate 16 and is fitted on its lowermost end fixedly with a crown gear 20. Crown gear 20 is clearly seen in FIG. 3, although it is only schematically shown by two concentric imaginary circles for the simplicity of drawing in FIG. 1. A pair of depending brackets 21 and 22 are fixedly attached to the lower surface of plate 16 and mount rotatably a horizontal idle shaft 23 which mounts fixedly pinion 24 and gear 25 at its opposite ends. Pinion 24 is kept in engagement with crown gear 20 as shown. Gear or worm wheel 25 is in meshing with a worm 26 on a vertical idle shaft 27 which is rotatably mounted in a bearing 28 on the plate 16 and provided fixedly with a pulley 29.

A conventional take-up reel assembly 30 is adapted to drive the pulley 29 through a belt 31 or a similar elongated transmission means, although the latter is shown schematically in FIG. 1 only by a dotted line 31 for the simplicity of the drawing. This assembly 30 comprises, as known per se, a detachable take-up reel, a turntable, take-up spindle, a clutch, an electric motor and a brake drum, although in FIG. 1 it is shown schematically only by a single circuit.

A setting knob 32 is concentrically arranged to dial 10 and frictionally mounted on the upper end of stationary shaft 15. On the lower surface of knob 32 there is provided an electric contact 33. In the similar way, a further electric contact 34 is fixedly attached on the upper surface of dial 10. These both contacts are arranged to describe a common imaginary circle (not shown) when seen from upper of the plane of FIG. 1, and arranged so as to be brought into contact with each other, as will be more fully described hereinafter.

As shown in FIG. 3, a stationary contact 35 is fixedly mounted at its one end on plate 16 and kept at its free end in slidable contact with a metallic sleeve 36 which is press-fit into the lower cylindrical space formed in dial 10 preferably made from a hard synthetic resin moulded material. Contact 34 on dial 10 is electrically connected with the conductive sleeve 36, while contact 33 is conductively connected with the stationary shaft 15 which is earthed as shown in FIG. 2.

On the plate 16 in the neighborhood of dial 10 there is provided a normally closed stationary switch 37 comprising a fixed contact 37*a* and a movable contact 37*b*, and a cam projection 38 which is formed on the lower cylindrical surface of dial 10 and arranged to act upon the movable contact 37*b* to break the switch 37 when the cam projection is brought into contact with the latter contact by rotation of the dial 10 as will be described more fully hereinafter. In FIGS. 1 and 2, the duplex rotary switch assembly described so far is shown by a chain-dotted line block 39.

The negative side of a D.C. power source 40 is earthed and the positive side thereof is connected by a lead 41 through manual switch 42, junction 43, diode 44 to a junction 45 to which relays 46 and 47 are connected in parallel. Junction 48 between these two relays is connected through a lead 49 having a junction 50 to stationary slidable contact 35. A lead 51 branches off the junction 43 to contact 52*a* of relay 52 which contact is connected by a lead 53 to both a brake plunger coil 54 and a pressure roller plunger coil 55. The opposite ends of these coils are earthed as shown. One end of relay coil 52 is connected by lead 49 to junction 48, while the opposite end of the coil 52 is earthed through condenser 57. By the provision of this condenser, the relay 52 may act as a kind of delay relay. A lead 58 connects between stationary contact 37*a* of switch 37 and junction 50 and is provided therein with relay contact 46*a* or relay 46.

Plug-in socket 59 is detachably connected with a plug 60*a* of an A.C. power source 60, and leads 61 and 62 connected the socket with relay contacts 47*a* and 47*b*, respectively, which are adapted to be operated upon by relay coil 47 as hinted by a chain-dotted line 63, controlling the rotational direction of capstan motor 64. Conventionally, this motor is mounted on the bottom surface of upper panel 100 of the machine and provided with a capstan shaft passing with running plays through the panel from below to the upper side although not shown. The main winding 64*a* of motor 64 is connected with reversing relay contacts 47*a* and 47*b* by leads 65 and 66, respectively, while the condenser compound winding 64*b* is connected across leads 61 and 62 through leads 67 and 68.

Junction 69 in lead 61 is connected through lead 70 having a manual switch 71 inserted therein to a junction 72 which is connected through a resistor 73 to take-up motor 74 of the aforementioned corresponding assembly and the opposite end of the motor circuit is connected to a junction 75 in lead 76 extending from junction 77 in lead 62. Lead 76 extends from junction 75 to one end of a supply reel motor 78 which is the main component, as known per se, of supply reel assembly having as conventionally and although not shown a spindle, a turntable, a supply reel and a brake drum, in addition to the said motor 78. The opposite end of the circuit of supply reel motor 78 is connected through lead 78′ having junction 79 and relay contact 80 to a junction 81. A resistor 82 is connected between junction 79 and 81. In the similar way, a further resistor 83 is connected between junctions 81 and 72. As indicated by a dotted line 84, a play-stop switch 85 and switches 42 and 71 are arranged to be manually actuated in unison with each other.

The operation of the arrangement described so far is as follows:

At first, a suitable point on a magnetic tape 85 is selected as the artificial starting terminal of playing program and this point is brought into engagement with a recording and playback head assembly H (FIG. 4) of the machine by actuating the tape drive mechanism comprising said motors 74, 64 and 78. At this point, turn manually dial 10 so as to bring its "O" mark in registration with a stationary indicator 86. In this way, the said artificial starting point has been registered. Next, turn the setting knob 32 so as to bring an indicator mark 32*a* into alignment with a suitably selected numeral on dial scale 11, thus establishing a desired terminating point of the musical program. By such preliminary operation, the cooperable contacts 33 and 34 are positioned at a certain circular distance from each other.

Third, the plug 60*a* of the A.C. current source circuit is inserted in socket 59, so that current is supplied from the power source 60 through leads 61 and 62 and relay contacts 47*a* and 47*b* to capstan motor 64, whereby the latter is caused to turn in a predetermined direction as usual.

Further, manual switch 85 is shifted manually from its "STOP" to "PLAY" position. By this operation, switches 42 and 71 are simultaneously closed. Thus, D.C. current will flow from battery 40, lead 41, closed switch 42, junction 43, rectifier 44, relay coils 46 and 47, junction 48, lead 49, relay coil 52 and condenser 57 to earth, whereby the condenser is fully charged, and at the same time, the energization of coil 52 will serve effectively to attract relay contact 52*a* from its closed to open position. By this operation, lead 53 in advance of the relay contact 52*a* is isolated from D.C. current source 40 and thus plunger coils 54 and 55 are also de-energized. With coil 54 de-energized, a conventional spring means 90 acts upon a brake arm 90′ so as to keep brake shoes 91 and 92 in their operative position shown in FIG. 2 so that both motors 74 and 77 are positively prevented from turning, while capstan motor 64 is rotating. With coil 55 de-engized, pressure roller 93 for cooperation with a capstan shaft (not shown) driven by motor 64 (which is now rotating) is kept in its non-operating position under the action of a conventional tension spring (not shown) as shown in FIGS. 1 and 2, thus supply and take-up reels (not shown) and magnetic tape 85 being kept at rest.

Current from junction 43 will flow through junction 45 and then through relay coils 46 and 47 in parallel. The value of current flowing through these two coils 46 and 47 is not so enough large as to actuate their relay contacts, provided that relay 52 is kept energized as at the present moment, so that relay contacts 46*a* and 80 are kept in their non-operative position and those denoted by 47*a* and 47*b* are kept in their regular position shown in FIG. 2 for the forward running of the capstan shaft.

Upon the closure of manual switch 71 as in the aforementioned way, current will flow from A.C. power source 60 through plug 60*a*, socket 59 engaged therewith, switch 71, control resistors 83 and 82 and lead 78′ to supply motor 78 and thence returns through lead 76, socket 59 and plug 60*a* to the power source, thus the motor is ready for reverse running at a slight speed for providing a proper tape tension, provided that brake shoe 92 be released. In fact, however, this reverse running of supply motor 78 cannot be put into effect, since the brake shoe is applied to the cooperating supply brake drum not shown. In the similar way, current is supplied to take-up motor 74 from junction 72 through control resistor 73. Nevertheless, motor 74 cannot run forward by virtue of the brake shoe 91 resiliently applied to the corresponding brake drum not shown. As already mentioned, capstan motor 64 is turning in the forward tape drive direction. However the magnetic tape cannot feed forward by virtue of the pressure roller 93 is kept separated from the capstan shaft.

After a certain time period, condenser 57 has been charged to a predetermined value, and then current cannot flow any more through relay coil 52 which is thus de-energized, and thereby, relay contact 52*a* is brought into its operating or closed position.

With the contact 52*a* closed, current will flow through lead 53 to plunger coils 54 and 55 which are thus energized. Therefore, the brake arm is shifted to its non-operating position against spring action and brake shoes 91 and 92 are released, while pressure roller lever is pivoted in the counterclockwise direction (FIGS. 1 and 2) about pivot pin as at 93*a* and thus the pressure roller 93 is brought into contact with the capstan spindle which is now rotating in the clockwise or forward direction with the tape 85 pinched between the capstan and the pressure roller as conventionally, thus causing the tape to advance at a predetermined feed rate.

Motion is transmitted simultaneously from the rotating takeup motor 30 through belt 31, pulley 29, worm gearing 25–26, crown gearing 24 and 20, reduction gearing 17 and 14, friction clutch 13 to dial 10 at a greatly reduced rate. The provision of worm gearing and crown gearing can effectively serve for preventing any reversed motion from being transmitted in the direction from dial 10 to take-up motor 30.

Control resistors 82, 83 and 73 are selected and provided so as to keep the tape tension at a proper value. Under the operating conditions so far described, a magnetic recording or play-back, as the case may be, will be carried out in the forward direction along a predetermined length of the tape. In this case, the indicating dial 10 is rotated in the aforementioned manner and contact 34 thereon comes nearer and nearer to its cooperative contact 33 on the knob 32 which is now kept stationary on studded shaft 15.

When the terminal end of the selected musical program, for instance, arrives, the both contacts 33 and 34 are brought into contact with each other and sliding, yet stationary contact 35 is thereby earthed through the engaged contacts 33–34 and the shaft 15. Thus, relays 46 and 47 are caused to actuate and their relay contacts 46*a*, 80, 47*a* and 47*b* are switched to the opposite position.

With closure of relay contact 80 as above mentioned, A.C. current from power source 60 will bypass control resistor 82 and flow through only a resistor 83 to supply motor 78 which will turn in the same rotational direction as before, yet with a stronger torque for initiating a reversed feed of the tape.

With shift of relay contacts 47*a* and 47*b* to their opposite operating position as described above, the capstan motor 64 will be caused to rotate in the reverse direction.

With the actuation of relay 46, its relay contact 46*a* is shifted to left in FIG. 2 and earthed through the closed contact pair 37*a*–37*b*. As will be noted, once closed switch contacts 33 and 34 are reopened by the reverse rotation of dial 10, which has been caused to take place by the aforementioned reverse tape drive. Relays 46 and 47 are prevented effectively from being de-energized on account of the above-mentioned break of the contacts 33 and 34, by the newly established earth circuit through closed relay contact 46*a*, lead 58 and switch 37, thus the said both relays continuing their operation, due to the above self-locking circuit.

On the other hand, the condenser 57 is discharged through relay coil 52, sliding contact 35 and the like to earth and this discharge current will energize the relay coil and thus its relay contact 52*a* is caused to break, whereby plunger coils 54 and 55 are de-energized, thus the brake shoes 91–92 and pressure roller 93 returning to their operative and nonoperative positions, respectively.

In the transient period between forward and reverse drives of the capstan motor 64, the tape drive mechanism is thus released from any load acting from outside thereof, and indeed by the provision of the brake application as well as the disengagement of the pressure roller.

After the initiation of the reverse tape feed, for instance, after several seconds, the time interval depending upon the operating characteristics selected for condenser 57, relay coil 52 and the like, the aforementioned discharge of the condenser will take place and the current flow through the coil 52 will diminish as in the aforementioned way. With the coil 52 thus de-energized, relay contact

52*a* will return to its closed position so as to reenergize both plunger coils 54 and 55. In this way, the brake shoes are again released and the pressure roller is brought into its operating position so that the reverse tape drive may be initiated. Thereupon, the dial 10 is caused to rotate thereby in the reverse direction.

It will be thus noted from the foregoing that while transferring the tape drive from its forward direction to its reverse direction the tape drive per se is at first stopped and simultaneously the motor drive is reversed, and only after elapse of a short idle time, for instance, several seconds thereafter, thus after the necessary completion of the revesre tape drive has been completed, the brake is released and the pressure roller is brought into engagement with the capstan so as to initiate practically the reverse feed.

In the foregoing, only a cycle of reciprocating recording or play-back has been described. If necessary, however, a practically infinite number of replays of the machine can be realized, as will be easily understood from the foregoing.

More specifically, a repeated forward operation of the machine from the aforementioned reverse tape drive can be realized substantially in the similar way, yet with use of projection 38 in combination of switch 37.

When, in the reverse feed as above mentioned, the original starting point of the selected tape length comes to the magnetic head for recording or play-back, the projection 38 on the cylindrical part of dial 10 engages the movable contact 37*b* of switch 37 and thus the earth connection thereof is interrupted. The current flowing from relay coils 46 and 47 through relay contact 46*a* to earth is thus checked and now caused to flow through relay coil 52 and condenser 57 to earth, whereby a recharging operation of the condenser will be initiated. When the charge of the condenser becomes equal in its potential to that of the battery 40, current flow through all the relay coils employed will cease. In other words, during each reversal operation of tape drive of the machine, the relay 52 and the relay group 46–7 will operate with a properly selected time lag which depends generally upon the time constant provided by a circuit serving for the service and including a capacitance (provided by condenser 52) and an inductance (provided by the aforementioned relay coils).

The operation of relays 46–7 is maintained by the charging current passing through these relay coils upon the release of the earth connection through switch 37, whereby the reversed or forward rotation in this case of the group of motors can be continued. Simultaneously, relay 52 is actuated so as to open its relay contact 52*a* so that release of the brake as well as disengagement of the pressure roller in the meaning as described hereinbefore may take place, whereby the tape drive is brought into dead stop.

With reduction of the charging current, relays 46–7 are de-energized and the capstan motor 64 is switched to its regular or advancing rotation. The current supplied to the motor 78 is reduced by the addition of resistor 82 in the motor circuit, whereby the speed of the motor is correspondingly lowered so as to be suitable for providing a proper back tension in the tape which is driven forward in this case.

At this time, the relay 52 continues to operate on the reasons already described and thus the pressure roller as well as the operating condition of the brake will be maintained. Thus, the capstan motor 64 can reverse its running direction from reverse to forward without being subject to loads from outside and a speed variation otherwise caused thereby can be effectively avoided. As in the previous case, the charging current will diminish after a predetermined short time, say, several seconds, and the operation of relay 52 will be paralyzed and so on.

It can be clearly understood that according to the principles of the invention, any excessive overload otherwise imposed upon the tape drive mechanism of the machine and any possible and disadvantageous tape speed fluctuation as commonly met with especially in the case of each tape drive reverse operation can be avoided and, if necessary, a substantially infinitely repeated reversed and reversed playing of the machine can take place without noticeable hindrance. When it is required to completely stop the machine, it is only necessary to shift the switch 85 and thus the commonly manipulatable switches 42 and 71 to their nonoperative side.

As easily conceivable by those skilled in the art, the recording or reproducing track or tracks must be shifted to the other each time the tape drive direction is reversed as described hereinbefore. Further, if the machine has been designed for stereo-recording or reproducing, the operation relying on two tracks such as denoted by 1 and 3 destined for one tape running direction must be shifted to that using another two tracks as represented by numerals 2 and 4. In the preferred embodiment shown, the forward operation of the machine utilizes such tracks 1 and 3, while the reverse or return operation is carried into effect under the utilization of tracks 2 and 4 of the tape. In addition, the tape drive operation must preferably be carried out while keeping amplifiers A and A′ at a high level of their operation.

It is highly recommendable to arrange the head H to be shiftable vertically so as to meet the above-mentioned track requirements. For this purpose, a plunger coil 97 is provided to make the necessary shift of the head H which coil is electrically connected in parallel with the aforementioned relay coils 46–7. For returning service for the head H, the latter is mounted on a mounting plate 96 which is supported resiliently through the intermediary of coil springs 99–100 on the upper deck of the machine.

In the circuit of plunger coil 97, a further relay coil 98 is inserted and arranged to operate simultaneously with the former coil so as to actuate relay contacts 98*a–b* which are inserted between amplifiers A–A′ and speaker circuit SP comprising amplifiers B–B′ and speakers sp1 and sp2.

If a reciprocating recording operation is carried into effect with use of the novel mechanism so far described, the number of reciprocations must be limited to a certain number which is determined by the provision of recording tracks of the tape.

The foregoing is considered as illustrative only of the principles of the invention. Further, since numerous modification and changes will readily occur to those skilled in the art, it is not desired to limit the invention to the exact construction and operation shown and described, and accordingly, all suitable modifications and equivalents may be resorted to, falling within the scope of the invention as claimed.

What is claimed is:

1. In a magnetic recording and reproducing machine of the type having a capstan spindle adapted to be driven by a reversible electric motor, a pressure roller engageable with said spindle so as to feed the magnetic tape when the tape is pinched between the spindle and pressure roller, rotary take-up and supply reel assemblies for taking up and supplying the tape, the improvement comprising, a first mechanical brake means for braking the supply assembly when applied to the rotary portion thereof and a second mechanical brake means for braking the take-up assembly when applied to the rotary portion thereof, a common solenoid associated with said two brake means for releasing the brake means, a second solenoid coupled to said pressure roller and when energized urging the roller against the spindle, electrical delay means electrically connected to both the common solenoid of said first and second brake means and to the said second solenoid for deenergizing said solenoids for a limited period upon each reversal of the tape whereby the brakes are applied and the pressure roller is disengaged from the spindle during such period.

2. The magnetic recording and reproducing machine of claim 1 including a source of direct current and wherein said delay means comprises a first relay coil, normally closed relay contacts open when said relay coil is energized, a condenser electrically connected in series with said relay coil across said source for charging therefrom and rotary switch means for discharging said condenser at a predetermined position of the rotary switch whereby during the charging and discharging of said condenser said first relay contacts are opened and the solenoids of the braking means and pressure roller are deenergized.

3. The magnetic recording and reproducing machine of claim 2 wherein the rotary switch has fixed and rotatable parts, a grounded contact carried by the rotatable parts of the switch and a fixed contact positioned for engagement with said last mentioned contact in one position of the rotatable part of the switch, the rotatable part of said switch means being mechanically connected to said take-up assembly to be driven thereby and said fixed contact engageable by said contact carried by the rotary part of the switch being electrically connected to said first relay coil for discharge of said condenser in said one position of the switch.

4. The magnetic recording and reproducing machine of claim 3 including a pair of normally closed contacts of which one is grounded associated with said rotary switch, a cam projection arranged on said rotary portion of said switch for opening said normally closed contacts upon rotation of said rotary portion and wherein two relay coils connected in parallel are inserted in the circuit between said D.C. source and said first relay coil, one of the said last mentioned two parallel relay coils controlling a connection between said D.C. source and said normally closed contacts of the switch assembly and the second of said two parallel relay coils having a plurality of relay contacts for controlling current to said capstan motor and to the rotary take-up and supply assemblies.

5. The magnetic recording and reproducing machine of claim 2 wherein said capstan drive motor and said rotary take-up and supply assemblies are powered from an A.C. source and wherein a manually operable multiple switch is provided for control of both said sources simultaneously.

References Cited by the Examiner

UNITED STATES PATENTS

| | | | |
|---|---|---|---|
| 2,430,538 | 11/1947 | Somers | 242—55.12 X |
| 2,561,602 | 7/1951 | Valentino et al. | 242—55.12 X |
| 3,032,285 | 5/1962 | Brede | 242—55.12 |

STANLEY N. GILREATH, *Primary Examiner.*

MERVIN STEIN, *Examiner.*

L. D. CHRISTIAN, *Assistant Examiner.*